United States Patent [19]

Kubo et al.

[11] Patent Number: 4,900,766
[45] Date of Patent: Feb. 13, 1990

[54] RADIATION-RESISTANT HIGH MOLECULAR COMPOSITION

[75] Inventors: Masashige Kubo, Tokuyama; Yukihiro Tsutsumi, Kawasaki; Fumio Okisaki, Shin-nanyo; Shunichi Fujimura; Teruo Fukuka, both of Ichihara, all of Japan

[73] Assignees: Toyo Soda Manufacturing Co., Ltd., Shin-nanyo; The Furukawa Electric Co., Ltd., Tokyo, both of Japan

[21] Appl. No.: 98,883

[22] Filed: Sep. 21, 1987

[30] Foreign Application Priority Data

Sep. 22, 1986 [JP] Japan .................................. 61-224356
Jun. 19, 1987 [JP] Japan .................................. 62-152785

[51] Int. Cl.$^4$ ................................................ G21F 1/02
[52] U.S. Cl. .................................... 523/136; 524/370; 524/369; 428/379; 428/389; 428/390
[58] Field of Search ................ 523/136; 524/370, 369

[56] References Cited

U.S. PATENT DOCUMENTS 4,554,173  11/1985  Fujimura et al. ................... 427/120

FOREIGN PATENT DOCUMENTS 50-158636  12/1975  Japan .................................. 524/370

Primary Examiner—Joseph L. Schofer
Assistant Examiner—John J. Guarriello
Attorney, Agent, or Firm—Oblon, Spivak, McClelland, Maier & Neustadt

[57] ABSTRACT

A radiation-resistant high molecular composition is disclosed, characterized in that, to the high molecular polymer, a halogenated acenaphtylene and/or condensates thereof represented by a following general formula [I]

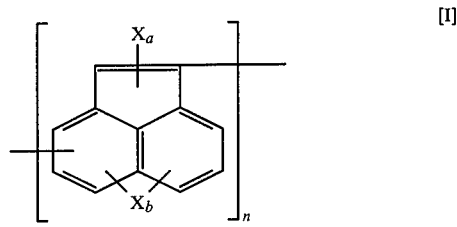

(wherein, X indicates a chlorine or bromine atom, a indicates 0 to 2, b indicates 1 to 6 and n indicates an integer not less than 1) and a diphenyl ether derivative represented by a following general formula [II]

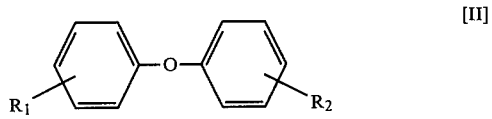

(wherein, $R_1$ and $R_2$ indicate any ones of hydrogen atom, alkyl, alkoxy, phenyl phenoxy, diphenyloxy and terphenyloxy group) and/or basic lead compound are formulated.

9 Claims, 1 Drawing Sheet

RADIATION-RESISTANT HIGH MOLECULAR COMPOSITION

BACKGROUND OF THE INVENTION

The present invention relates to a high molecular composition, the radiation resistance being improved drastically, and an electric wire or cable used said high molecular composition as a covering material.

Organic high molecular materials used for nuclear reactors, breeder reactors, treatment facilities of radioactive wastes, ionizing radiation generator or the like, for example, electric wires, cables and various instruments are always exposed to radiation to a considerable extent.

Such high molecular materials having been subjected to the exposure of high doses of radiation in the air generally become hard and brittle to lose the pliability and to weaken, so that the characteristics thereof are lowered remarkably.

For this reason, high degree of radiation resistance is requested for the high molecular compositions used for the covering and insulating materials of electric wires, cables, etc., packings, seal materials, frames, hose materials, etc. having such purpose of use from the standpoints of economics and safety, and the researches on the technology to provide the radiation resistance to high molecular materials are advancing.

It has been known that, by formulating a halogenated acenaphthylene and/or condensates thereof represented by a following general formula [I]

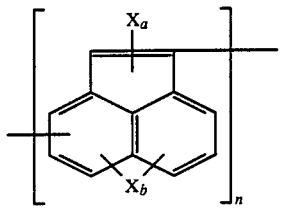

[I]

(wherein X indicates a chlorine or bromine atom, a indicates 0 to 2, b indicates 1 to 6 and n indicates an integer not less than 1) to the high molecular polymer, high degree of radiation resistance and excellent fire resistance can be provided to the high molecular polymer (Japanese Patent Publication Nos. Sho 58-1146 and Sho 60-25063).

When formulating said halogenated acenaphthylene and/or condensates thereof to the high molecular polymer, said halogenated acenaphthylene and/or condensates thereof are used usually by allowing to melt and disperse into the high molecular polymer by heating at the time of kneading or thermal molding.

As an another method, utilizing the radical polymerization reaction of double bond between carbon 1 and carbon 2 of halogenated acenaphthylene unit, free radical-generating treatment is carried out after the molding to graft onto the high molecular polymer. It is known that the improvements in the radiation resistance and the fire resistance of high molecular polymers can be achieved by these methods.

As a result of investigations of the effect of provision of radiation resistance to the high molecular polymer by the use of halogenated acenaphthylene and/or condensates thereof, the inventors have found that there occurs a significant difference in the developement of radiation resistance depending upon the fluctuation of processing conditions, difference in quality of halogenated acenaphthylene and/or condensates thereof and the like.

Namely, when the halogenated acenaphthylene and/or condensates thereof were formulated to polyolefinic resins, rubbers, etc., if the processing temperature was lower than the melting temperature of halogenated acenaphthylene and/or condensates thereof, or if the condensation composition of condensates of halogenated acenaphthylene was high, such a phenomenon that the elongation ratio at the fracture point being a judging criterion of radiation resistance was lowered was recognized resulting in the problem.

Moreover, in consequence of the investigations on the application of high molecular compositions formulated the halogenated acenaphthylene and/or condensates thereof to the use for a nuclear reactor, that the hot-water resistance proved poor. Nemely, when these high molecular compositions were exposed to the high-temperature steam of 150° C. for more than 24 hours, the mechanical properties were kept, but the sheet swelled and that the electric properties, in particular, the dielectric breakdown voltage was lowered.

In addition, when formulated to crosslinked polyethylene, there were such problems that the crosslinking of polyethylene was hindered not to raise the gel fraction and to cause a decrease in the deformation temperature under heat and such processing problems that the surface of sheet was roughened at the time of press molding and the like.

Furthermore, as a designing standard of nuclear power station, loss of coolant accident (LOCA) is established. The requirement matter states that it is necessary for the high molecular polymers to retain their good electric characteristics even if exposed to heated steam or hot water after the exposure to radiation. However, with those of which the elongation ratio at the fracture point was lowered after the exposure to radiation as described above, it was also recognized that the electric characteristics were lowered after the exposure to steam. In order words, even after bromine was eliminated through the exposure to radiation and the brominated acenaphthylene and/or condensates thereof became to a stabilized state, the phenomenon that the electric characteristics were lowered remarkably by super heated steam or hot water was recognized to become a problem.

The purpose of the present invention is to provide a high molecular composition stably developable the high-degree of radiation resistance, hot-water resistance and excellent electric characteristics after the LOCA test by being not subjected to the influence of fluctuation of processing and molding conditions and by suppressing the influence of quality of halogenated acenaphthylene and/or condensates thereof.

In view of these problems of the prior art, the inventors made diligent investigations on the method of developing the radiation resistance of high molecular composition formulated the halogenated acenaphthylene and/or condensates thereof. As a result, the inventors have found that, depending on the processing and molding conditions and the difference in the quality of halogenated acenaphthylene and/or condensates thereof, the dispersibility and the compatibility in the high molecular polymer differ subtly to affect significantly on the development of various characteristics.

In order to solve this problem, the inventors energetically searched for additives not affecting adversely on the physical properties of the high molecular compositions, such as an improver of dispersibility to improve the dispersibility of halogenated acenaphthylene and/or condensates thereof, and a trapping agent of hydrogen halide formed by de-halogenation.

As a result, various kinds of high molecular resins, rubbers, ester plasticizers, paraffinic and aromatic process oils, various lubricants, etc. proved to hardly improve the dispersibility and, in the case of the formulation of metal oxides such as zinc white, magnesium oxide, antimony trioxide, etc. caused swelling by hot water and did not prevent the lowering in electric characteristics.

SUMMARY OF THE INVENTION

The inventors have found that, when formulating a diphenyl ether derivative represented by a following general formula [II]

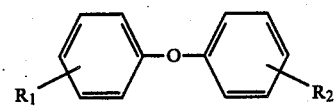

[II]

(wherein, $R_1$ and $R_2$ indicate any ones of hydrogen atom, alkyl, alkoxy, phenyl, phenoxy, diphenyloxy and terphenyloxy group) and/or basic lead compound to the high molecular polymer in appropriate amount in addition to the halogenated acenaphthylene and/or condensates thereof represented by the following general formula [I]

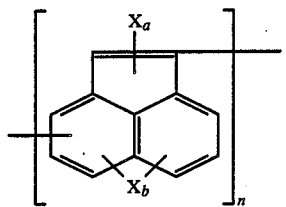

[I]

(wherein, X indicates a chlorine or bromine atom, a indicates 0 to 2, b indicates 1 to 6 and n indicates an integer not less than 1), the dispersibility in the high molecular polymer of halogenated acenaphthylene and/or condensates thereof is improved remarkably and specifically and the radiation resistance and various characteristics of the high molecular composition are enhanced to develop stably.

Further, the formulation of these diphenyl ether derivatives and/or basic lead compounds have been found not to affect adversely on the crosslinking characteristics of high molecular polymer and also on the electric and mechanical characteristics leading to the completion of the invention.

DETAILED DESCRIPTION OF THE INVENTION

Figure 1:
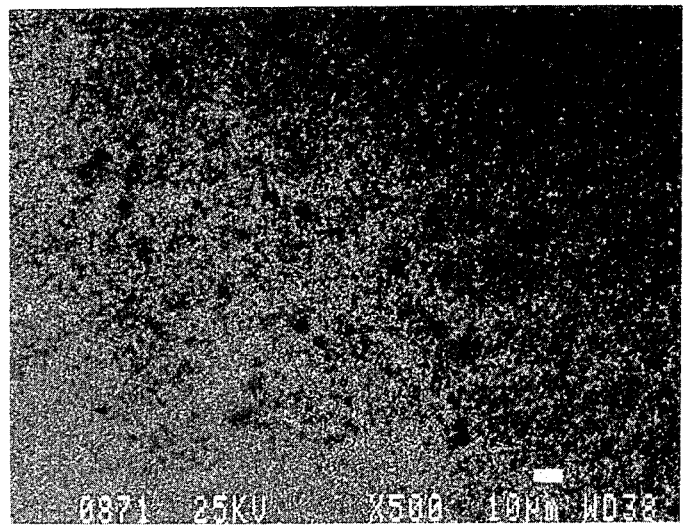
FIG. 1 is a photograph showing the dispersibility of brominated acenaphthylene condensates on the surface of the molded sheet of polymer composition of the present invention, which was measured by the use of X-ray microanalyzer.

In following, explanation will be made in more detail.

The radiation-resistant high molecular composition of the present invention can be achieved by formulating the halogenated acenaphthylene and/or condensates thereof and diphenyl ether derivative and/or basic lead compound to the high molecular polymer.

As the high molecular polymers, the radiation resistance being improvable, for example, the thermoplastic resins such as polyethylene, polypropylene, polybutene, ethylene-vinyl acetate copolymer, ethylene-ethyl acrylate copolymer, ethylene-propylene copolymer, ethylene-propylene-diene copolymer, ethylene-vinyl chloride copolymer, ethylene-vinyl acetate-grafted vinyl chloride copolymer, ethylene-ethyl acrylate-grafted vinyl chloride copolymer, ethylene-propylene-grafted vinyl chloride copolymer, chlorinated polyethylene, chlorinated polyethylene-grafted vinyl chloride copolymer, polyamides, acrylic resins, etc., elastomers, polyesters, polyurethanes, thermosetting resins such as epoxy resin, phenol resin, melamine resin, urea resin, etc., butyl rubber, chloroprene rubber, nitrile rubber, natural rubber, silicone rubber, chlorosulfonated polyethylene, styrene-butadiene rubber, styrene-butadiene-acrylonitrile copolymer, polyester-ether elastomer, etc. can be exemplified. Among them, polyolefinic resins represented by polyethylene and polyolefinic elastomers represented by ethylene-propylene-diene copolymer are general-purpose polymers having various characteristics excellent in the electric characteristics, chemical resistance, etc. Since the inflammability being a short-coming thereof can also be improved according to the present invention, they are the most suitable polymers.

The halogenated acenaphthylene and/or condensates thereof referred to so in the present invention are shown by the following general formula [I]

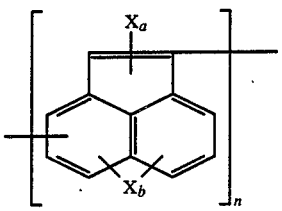

[I]

(wherein, X, a, b and n are same as above), i.e. compounds having at least not less than one of halogen atoms on the aromatic rings of acenaphthylene. The condensates are those wherein the halogenated acenaphthene is condensed formally through the Friedel-Craft reaction to become multimer with a condensation degree of two or more and, successively, carbon-carbon double bond is formed on benzyl position through dehydrohalogenation reaciton.

The bonding pattern of the condensates is an intermolecular bonding between carbon on benzyl position of acenaphthylene and carbon on allyl position of another acenaphthylene. As the bonding points, for example, 1 (or 2), 5'-

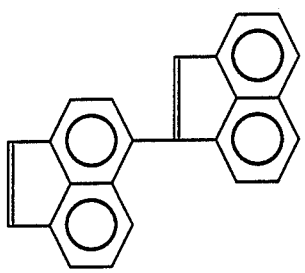

1 (or 2), 6'-

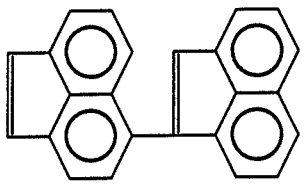

or the like are exemplified, but, besides of these, bondings at 1 (or 2), 3'-, 1 (or 2), 4'-, 1 (or 2), 7'-, 1 (or 2), 8'-, etc. are considerable.

With regard to those with a bonding degree of three or more, the constitution unit is allowed to increase by any one of such bondings. The condensates referred to so in the present invention are those with a condensation degree of not more than 10, which are excellent in the compatibility with resins.

The amount of these halogenated acenaphthylene and/or condensates thereof to be formulated to the high molecular polymer is preferable to be 5 to 150 parts by weight per 100 parts by weight of high molecular polymer in order to secure good radiation resistance at the lower limit and elongation characteristics, pliability, etc. of high molecular composition at the upper limit. If under 5 parts by weight, the radiation resistance dose not develop sufficiently and, even if formulated in amounts of over 150 parts by weight, the weighting effect would hardly be seen.

Next, the diphenyl ether derivatives referred to so in the present invention are compounds represented by the following general formula [II]

[II]

(wherein, $R_1$ and $R_2$ are same as above), or a mixture of these.

For example, diphenyl ether, monoalkyldiphenyl ether, dialkyldiphenyl ether, monoalkoxydiphenyl ether, dialkoxydiphenyl ether, phenoxydiphenyl, phenylphenoxydiphenyl, phenoxydiphenyl ehter, diphenoxydiphenyl ether, phenoxypheoxydiphenyl, phenoxyphenoxyterphenyl, etc. can be mentioned concretely.

The amount of these diphenyl ether derivatives to be formulated is selected within a range of 1 to 100 parts by weight per 100 parts by weight of halogenated acenaphthylene and/or condensates. The reasons are that, if under 1 part by weight, the effect to allow the halogenated acenaphthylene and/or condensates thereof to disperse uniformly into the high molecular polymer is insufficient and, on the other hand, that, even if exceeded 100 parts by weight, the weighting effect can hardly be seen.

Next, the basic lead compounds referred to so in the present invention are compounds selected from lead oxides, lead hydroxides, lead phosphates, lead phosphites, lead carbonates, lead sulfits, lead carboxylates, lead sulfides, lead borates and lead metaborates or double salts containing these as components. Moreover, mixtures of these are also included. For example, concretely, lead monoxide (PbO), red lead ($Pb_3O_4$), white lead ($2PbCO_3.Pb(OH)_2$), lead dioxide ($PbO_2$), tribase ($ePbO.PbSO_4.H_2O$), basic lead silicate ($PbO.H_2O.2PbSiO_3$), dibasic lead phosphite ($2PbO.PbHPO_3.1/2 H_2O$), debasic lead phthalate ($2PbO.Pb(C_8H_4O_4)$), tribasic lead maleate ($3PbO.Pb(C_4H_2O_4).H_2O$), lead silicate precipitated together with silica gel ($PbSiO_3.mSiO_2$), lead salicylate ($Pb(C_7H_5O_3)_2$), lead stearate ($Pb(C_{18}H_{35}O_2)_2$), dibasic lead stearate ($2PbO.Pb(C_{18}H_{35}O_2)_2$), lead naphthenate ($Pb(C_nH_{2n-1}O_2)_2$), lead acetate ($Pb(C_2H_3O_2)_2$), lead oxalate ($PbCrO_4$), basic lead sulfite ($PbO.PbSO_3$), lead phosphate ($Pb_3(PO_4)_2$), lead carbonate ($PbCO_3$), lead metaborate ($Pb(BO_2)_2$), lead borate ($Pb_3(BO_4)_2$), etc. can be mentioned.

Further, the basic lead compounds used in the present invention are preferable to be powdery compounds having a specific surface area of at least 0.1 m$^2$/g determined by BET method.

The reason is that, with compounds having a specific surface area of not less than 0.1 m$^2$g, remarkable improvement effect on the hot-water resistance can be recognized, but, with those having a specific surface area of under 0.1 m$^2$/g, the effect on the improvement in hot-water resistance can hardly seen upon addition and, even if increased the addition amount, the effect is small.

The upper limit of the specific surface area is not particularly confined, but it is around 50 m$^2$/g usually.

The amount of these basic lead compounds to be formulated is selected within a range of 10 to 100 parts by weight per 100 parts by weight of halogenated acenaphthylene and/or condensates thereof. The reasons are that, if under 10 parts by weight, the effect to improve the hot-water resistance is insufficient and, on the other hand, that, even if over 100 parts by weight, the weighting effect would hardly be seen.

The reason why the improvement in the dispersibility of halogenated acenaphthylene and/or condensates thereof in the high molecular polymer enhances the radiation resistance is not well clear. However, through the uniform dispersion, the following two points may result in the inhibition of deterioration of the polymer, so that the radiation resistance would be developped; the acenaphthylene derivatives act effectively as trap sites of excitation energy generated by the irradiation of radiation to enhance the transfer efficiency of the excitation energy, and the formed polymer radicals are effectively captured.

The reason is also not well clear that the hot-water resistance of the high molecular composition is improved conspicuously by the formulation of basic lead compounds. However, sorption of moisture by hydrogen halide gas byproduced, although in very small amount, by heating or exposure to high-temperature steam is considered to be responsible to the lowering of the electric characteristics. On the otherhand, the formulation of the basic lead compounds results in effective capture of said byproduced hydrogen halide gas and formation of water-insoluble salt. Consequently, the hot-water resistance is considered to be improved.

Formulation of Suitable reinforcement agents, extenders, pigments, lubricants, vulcanizing agents, crosslinking assistants, antioxidants, ultraviolet absorbers, flame retardation, assistants etc. to the compositions of the present invention may safely be applicable in appropriate amount within a range not lowering the characteristics thereof depending on the purpose of use etc.

As a formulating recipe in the present invention, the halogenated acenaphthylene and/or condensates thereof and the diphenyl ether derivatives and/or basic lead compound are formulated to the high molecular polymer and then, by heating sufficiently at the time of kneading, the halogenated acenaphthylene and/or condensates thereof are allowed to melt and disperse uniformly into the high molecular polymer.

Further, it is effective depending on the kind of resins that, when molding of these high molecular compositions, free radical-generating treatment is given by the chemical crosslinking method comprising of incorporation of organic peroxides such as dicumyl peroxide etc. and heating, and so-called radiation crosslinking method wherein the ionizing radiations such as $\beta$-rays, $\gamma$-rays, electron beams, etc. are irradiated, and the like to allow the halogenated acenaphthylene and/or condensates thereof to be grafted onto the high molecular substrate and simultaneously to give the crosslinking treatment to the high molecular polymer.

In particular, the utilization of thus crosslinked high molecular compositions of the present invention for covering materials of electric wires and cables is effective to make them long lives under the environment of radiation, so that the value of industrial utilization is very large.

The crosslinking method in this case is preferable to use organic peroxide compounds as crosslinking agents and to perform under moisture-free condition. For example, there are methods wherein molten salt bath, Wood's metal bath, liquid paraffin bath, bath of nonoxidative inert gas, heated metal tube, etc. are utilized, methods wherein heating means such as high-frequency heating, microwave heating, infrared heating, fluidized bed heating, etc. are used independently or in combination, and the like. When using the high molecular compositions of the present invention as the covering materials of electric wires and cables, the method by molten salt bath is preferable and, in more detail, the molten salt bath having sodium nitrate, potassium nitrate and sodium nitrite as the major components is preferable particularly.

The temperature at the time of crosslinking has only to be over the decomposition temperature of the organic peroxide crosslinking agents aforementioned.

Moreover, as a covering method of wires, extrusion according to usual methods for the covering of the conductors in a desired thickness and the like can be applied sufficiently.

To the insulated wire cores thus obtained, in some cases protective sheaths are provided to prevent the external injuries, or, in other cases, a plurality of insulated wire cores aforementioned are collected to form cable cores and protective sheaths is provided similarly onto said cable cores.

With regard to the crosslinking means of this sheath, too, crosslinked plastics or vulcanized rubbers are provided from the aspect of mechanical and thermal characteristics. If applying the method of the present invention described above at the time of providing the sheath layer of said crosslinked plastics or vulconized rubbers, one with characteristics further improved can be obtained preferably.

As such sheath materials, vinyl chloride resin, chlorosulfonated polyethylene, chloroprene rubber, etc. are applicable. In particular, chlorosulfonated polyethylene is suitable for the purpose of the present invention because of its excellent radiation resistance, water resistance and fire resistance.

In following, the present invention will be further illustrated based on the examples, but is not confined to these.

EXAMPLE 1 THROUGH 3 AND COMPARATIVE EXAMPLE 1 AND 2

To ethylene-propylene-diene copolymer were added formulating agents to give compositions as shown in Table 1. Besides, the unit of amount of respective ingredients formulated in the respective examples below is part by weight.

After uniformly kneaded all ingredients except the free radical-generating agent on a hot roll of 160° C., the free radical-generating agent was added at 20° to 70° C. Then, these were heated for 30 minutes under pressure using a hot press of 160° C. to mold sheets with a thickness of 1 mm.

Besides, the halogenated acenaphthylene and/or condensates therof used in these examples are condensed bromoacenaphthylene composition specified as follows:

| Content of bromine | 55.7% |
| Melting point | 125–143° C. |
| Condensate composition | |
| Monomer | 19.0% |
| Dimer | 19.5% |
| Trimer | 18.9% |
| Tetramer to octamer | 42.6% |

The condensate composition was determined by means of high performance liquid chromatography using a column with an inner diameter of 7.5 mm and a length of 600 mm packed with TSK gel G1000H8 (made by Toyo Soda Mfg. Co.).

To the sheets obtained with respective compositions, 200 Mrad of $\alpha$-ray were irradiated at a dose rate of 0.5 Mrad/hr at room temperature in the air. The mechanical characteristics before and after the irradiation were determined according to JIS C3005 to estimate the radiation resistance of respective samples. The results are shown in Table 1.

Further, the change of grafting ratio of halogenated acenaphthylene and/or condensates thereof onto the high molecular polymer before and after the irradiation of $\gamma$-ray was determined by the Soxhlet extraction method with tetrahydrofuran. The results obtained are shown in Table 1.

Figure 2:
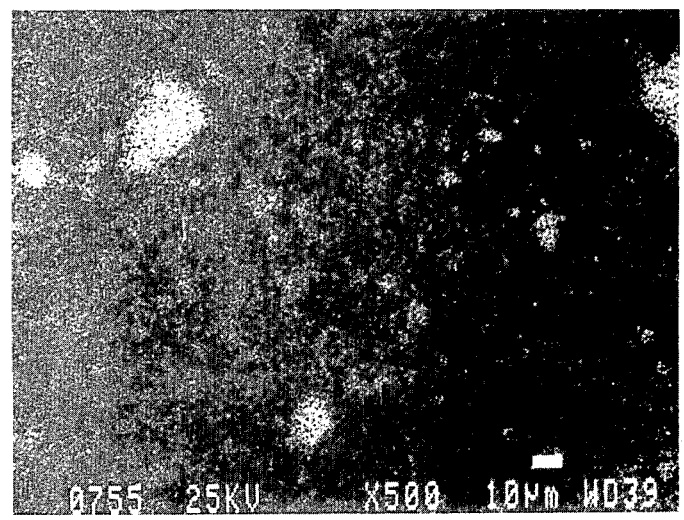
FIG. 2 is a photograph measured with a comparative example.

Moreover, the dispersibility of condensed bromoacenaphthylene in the surface of respective sheets was measured with Brk$\alpha$ line by the use of X-ray microanalyzer. The dispersibility in the sheet of Example 1 and that in the sheet of Comparative example 1 are shown in FIG. 1 and FIG. 2, respectively. The white dots show the existence of bromine atoms.

TABLE 1

| Formulating agent and characteristics | Example 1 | Example 2 | Example 3 | Comparative example 1 | Comparative example 2 |
|---|---|---|---|---|---|
| Etylene-propylene-diene copolymer *1 | 100 | 100 | 100 | 100 | 100 |
| Nocrac 224 *2 | 1.5 | 1.5 | 1.5 | 1.5 | 1.5 |
| Sulfur | 0.4 | 0.4 | 0.4 | 0.4 | 0.4 |
| Talc | 100 | 100 | 100 | 100 | 100 |
| Zinc white | 5 | 5 | 5 | 5 | 5 |
| Antimony trioxide | 11.8 | 11.8 | 11.8 | 11.8 | |
| Dicumyl peroxide | 3 | 3 | 3 | 3 | 3 |
| Condensed bromoacenaphythylene composition | 45 | 45 | 45 | 45 | 0 |
| m-(m-Phenoxyphenoxy)diphenyl | 5 | | | | 5 |
| Monoalkyldiphenyl ether *3 | | 5 | | | |
| Dialkyldiphenyl ether *3 | | | 5 | | |
| Uniform dispersibility of brominated acenaphthylene condensate composition in sheet | Excellent | Excellent | Excellent | No good | — |
| (Mechanical characteristics) | | | | | |
| Initial Tensile strength (Kg/mm$^2$) | 0.88 | 0.76 | 1.11 | 0.82 | 0.88 |
| Initial Elongation (%) | 640 | 695 | 660 | 752 | 765 |
| After irradiation Tensile strength (Kg/mm$^2$) | 0.87 | 0.87 | 1.03 | 0.98 | 0.98 |
| After irradiation Elongation (%) | 145 | 143 | 165 | 70 | 53 |
| (Electric characteristic) Volume resistance (Ω-cm)(21° C.) | $3.5 \times 10^{15}$ | $4.3 \times 10^{15}$ | $4.6 \times 10^{15}$ | $3.6 \times 10^{15}$ | $2.6 \times 10^{15}$ |
| (Grafting ratio of condensed bromoacenaphthylene composition) (%) | | | | | |
| Initial | 25.2 | 26.0 | 25.9 | 21.4 | — |
| After irradiation | 40.4 | 42.3 | 41.3 | 33.6 | — |

*1 Made by Japan Synthetic Rubber Co., EP-2l (Bonding amount of propylene: 40% by weight).
*2 Made by Oouchi Shinko Co., 2,2,4-Trimethyl-l,2-dihydroquinoline copolymer.
*3 Number of carbon atoms in alkylmoiety: 16

The condensed bromoacenaphthylene composition used in Example 1 through 5 and Comparative example 1 through 3 contains as much as 42.6% of the high-condensation components of tetra to octamer and the condensation composition is high. With the formulation of this composition without the diphenyl ethers to the high molecular polymer, the effect to provide the radiation resistance, which is shown by the fracture elongation after the irradiation of γ-rays, was small.

On the other hand, the condensed bromoacenaphthylene composition used in Example 6 through 9 and Comparative example 4 through 8 described later contains as little as 18.4% of the tetra to actamer and the condensation composition is low. With the formulation of this, high radiation resistance can be developed stably.

As described above, the effect to provide the radiation resistance clearly depended on the difference the condensate composition of condensed bromoacenaphthylene.

However, as evident from Table 1 and FIG. 1, even when formulated the brominated acenaphthylene condensates high in the condensation composition, bythe addition of diphenyl ether derivatives of the present invention, the uniform dispersibility thereof was achieved and the mechanical characteristics after the irradiation of radiation were also excellent, in particular, the lowering in the elongation characteristic became to be suppressed. Whereas, without diphenyl ether derivative (Comparative example 1), the deterioration of mechanical characteristics after the irradiation of radiation was remarkable resulting from the inhomogeneity of dispersibility, as shown in FIG. 2, due to the partial aggregation of the brominated acenaphthylene condensates. Moreover, in the case of addition of the diphenyl ether derivative alone (Comparative example 2), the radiation resistance was not improved.

On the other hand, the uniform dispersion of condensed bromoacenaphthylene enhanced its grafting before and after γ-ray irradiation. This fact shows effective capture of polymer radicals generated by the γ-ray irradiation as well as the effect to promote transfer of the excitation energy of irradiated the γ-ray.

Moreover, the addition of diphenyl derivatives hardly affects adversely on the crosslinking of polymer and the electric characteristics.

EXAMPLE 4 AND 5 AND COMPARATIVE EXAMPLE 3 and 4

To polyethylene, the formulating agents were added so as to give the compositions shown in Table 2. These were kneaded well on a heated roll and the compositions thus obtained were molded with press for 30 minutes at 160° C. to prepare sheets with a thickness of 1 mm.

On the respective sheets obtained, the dispersibility of the condensed bromoacenaphthylene initial mechanical characteristics and those after the irradiation of 200 Mrad of γ-rays were determined. The results are shown in Table 2.

TABLE 2

| Formulating agent and characteristics item | Example 4 | Example 5 | Comparative example 3 | Comparative example 4 |
|---|---|---|---|---|
| Polyethylene *4 | 100 | 100 | 100 | 100 |

TABLE 2-continued

| Formulating agent and characteristics item | | Example 4 | Example 5 | Comparative example 3 | Comparative example 4 |
|---|---|---|---|---|---|
| Nocrac 300 *5 | | 0.5 | 0.5 | 0.5 | 0.5 |
| Dicumyl peroxide | | 3 | 3 | 3 | 3 |
| Antimony trioxide | | 11.8 | 11.8 | 11.8 | |
| Condensed bromoacenaphythylene composition | | 45 | 45 | 45 | |
| m-(m-phenoxyphenoxy)-diphenyl | | 5 | | | 5 |
| Monoalkyldiphenyl ether | | | 5 | | |
| Uniform dispersibility of condensed bromoacenaphthylene in sheet | | Excellent | Excellent | No good | — |
| (Mechanical characteristics) | | | | | |
| Initial | Tensile strength (Kg/mm$^2$) | 2.31 | 2.25 | 1.97 | 2.30 |
| | Elongation (%) | 510 | 495 | 488 | 513 |
| After irradiation | Tensile strength (Kg/mm$^2$) | 1.82 | 1.88 | 1.42 | 1.37 |
| | Elongation (%) | 170 | 182 | 90 | 55 |

*4 Density: 0.920, MI: 1.0
*5 Made by Ooucki Shinko Co., 4,4'-Thiobis(6-t-butyl-3-methylphenol).

EXAMPLES 6 THROUGH 9 AND COMPARATIVE EXAMPLE 5 THROUGH 8

The sheets of Table 3 were prepared in the same procedure as described for example 1. The molded sheets were exposed to high-temperature steam of 150° C., 4.9 kg/cm$^2$ for 24 hours. Then the hot-water resistance of each specimen was estimated by the volume resistance and the dielectric breakdown voltage. The results, as well as the other results obtained in the similar manner to example 1 are also shown in Table 3.

Besides, the halogenated acenaphthylene and/or condensates therof used in these examples are condensed bromoacenaphthylene composition specified as follows:

| | |
|---|---|
| Content of bromine | 55.7% |
| Melting point | 125–143° C. |
| Condensate composition | |
| Monomer | 17.6% |
| Dimer | 36.0% |
| Trimer | 28.0% |
| Tetramer to octamer | 18.4% |

The condensate composition was determined by the same method for previous examples.

TABLE 3 (1)

| Formulating agent and characteristics item | | Example 6 | Example 7 | Example 8 | Example 9 |
|---|---|---|---|---|---|
| Ethylene-propylene-diene copolymer *1 | | 100 | 100 | 100 | 100 |
| Nocrac 224 *2 | | 1.5 | 1.5 | 1.5 | 1.5 |
| Sulfur | | 0.4 | 0.4 | 0.4 | 0.4 |
| Talc | | 100 | 100 | 100 | 100 |
| Zinc white | | 5 | 5 | 5 | 5 |
| Stearic acid | | 1 | 1 | 1 | 1 |
| Antimony trioxide | | 11.8 | 11.8 | 11.8 | 11.8 |
| Dicumyl peroxide | | 3 | 3 | 3 | 3 |
| Condensed bromoacenaphthylene | | 45 | 45 | 45 | 45 |
| White lead | | 15 | | | |
| Tribase | | | 15 | | |
| Litharge | | | | 30 | |
| Dibasic lead phthalate | | | | | 10 |
| Lead chloride | | | | | |
| Specific surface area of lead compound *3 | | 1.20 | 1.92 | 0.34 | 0.83 |
| (Radiation resistance) | | | | | |
| Initial | Tensile strength (Kg/mm$^2$) | 0.87 | 0.91 | 0.77 | 0.80 |
| | Elongation (%) | 640 | 670 | 710 | 695 |
| After irradiation | Tensile strength (Kg/mm$^2$) | 0.86 | 0.77 | 0.82 | 0.92 |
| | Elongation (%) | 145 | 160 | 155 | 145 |
| (Fire resistance) | | | | | |
| Oxygen index | | 36.4 | 34.8 | 36.0 | 34.2 |
| (Hot-water resistance) | | | | | |
| Initial | Volume resistance (Ω-cm) | $4.5 \times 10^{15}$ | $5.1 \times 10^{15}$ | $3.6 \times 10^{15}$ | $4.2 \times 10^{15}$ |
| | Dielectric breakdown voltage (kV/mm) | 24.3 | 24.6 | 22.9 | 22.3 |
| After exposure | Volume resistance (Ω-cm) | $5.1 \times 10^{15}$ | $5.0 \times 10^{15}$ | $2.9 \times 10^{15}$ | $4.5 \times 10^{15}$ |
| | Dielectric breakdown voltage (kV/mm) | 24.8 | 24.0 | 22.6 | 22.8 |

*1 Made by Japan Synthetic Rubber Co., EP-2l(Bonding amount of propylene: 40% by weight).
*2 Made by Ooucki Shinko Co., 2,2,4-trimethyl-1,2-dihydroquinoline copolymer.
*3 Determined by BET method

TABLE 3 (2)

| Formulating agent and characteristics item | Comparative example 5 | Comparative example 6 | Comparative example 7 | Comparative example 8 |
|---|---|---|---|---|
| Ethylene-propylene-diene copolymer *1 | 100 | 100 | 100 | 100 |
| Nocrac 224 *2 | 1.5 | 1.5 | 1.5 | 1.5 |
| Sulfur | 0.4 | 0.4 | 0.4 | 0.4 |
| Talc | 100 | 100 | 100 | 100 |

TABLE 3 (2)-continued

| Formulating agent and characteristics item | | Comparative example | | | |
|---|---|---|---|---|---|
| | | 5 | 6 | 7 | 8 |
| Zinc white | | 5 | 5 | 5 | 5 |
| Stearic acid | | 1 | 1 | 1 | 1 |
| Antimony trioxide | | 11.8 | 11.8 | 11.8 | 11.8 |
| Dicumyl peroxide | | 3 | 3 | 3 | 3 |
| Condensed bromoacenaphthylene | | 45 | 45 | 45 | 45 |
| White lead | | | 3 | | |
| Tribase | | | | | |
| Litharge | | | | | |
| Dibasic lead phthalate | | | | 30 | |
| Lead chloride | | | | | 15 |
| Specific surface area of lead compound *3 | | — | 1.20 | 0.06 | 1.31 |
| (Radiation resistance) | | | | | |
| Initial | Tensile strength (kg/mm$^2$) | 0.82 | 0.93 | 1.03 | 0.87 |
| | Elongation (%) | 752 | 660 | 595 | 630 |
| After irradiation | Tensile strength (kg/mm$^2$) | 0.86 | 0.90 | 0.95 | 0.85 |
| | Elongation (%) | 150 | 143 | 141 | 151 |
| (Fire resistance) | | | | | |
| Oxygen index | | 34.8 | 35.0 | 34.2 | 36.0 |
| (Hot-water resistance) | | | | | |
| Initial | Volume resistance (Ω-cm) | $4.1 \times 10^{15}$ | $3.7 \times 10^{15}$ | $4.7 \times 10^{15}$ | $5.5 \times 10^{15}$ |
| | Dielectric breakdown voltage (kV/mm) | 22.0 | 22.9 | 24.7 | 22.3 |
| After exposure | Volume resistance (Ω-cm) | $2.8 \times 10^{10}$ | $1.8 \times 10^{11}$ | $3.1 \times 10^{12}$ | $4.8 \times 10^{11}$ |
| | Dielectric breakdown voltage (kV/mm) | 5.8 | 6.7 | 8.2 | 6.5 |

*1 Made by Japan Synthetic Rubber Co., EP-2l(Bonding amount of propylene:40% by weight).
*2 Made by Ooucki Shinko Co., 2,2,4-trimethyl-1,2-dihydroquinoline copolymer.
*3 Determined by BET method

EXAMPLE 10 THROUGH 12 AND COMPARATIVE EXAMPLE 9 AND 10

The sheets of Table 4 were prepared in the same procedure as described for example 3.

The state of respective sheets thus made up was observed, and the gel fraction and heat deformation rate were measured. In addition, the fire resistance, radiation resistance and hot-water resistance were estimated according to Example 6. The results are shown in Table 4.

TABLE 4

| Formulating agent and characteristics item | | Example | | | Comparative example | |
|---|---|---|---|---|---|---|
| | | 10 | 11 | 12 | 9 | 10 |
| Polyethylene *4 | | 100 | 100 | 90 | 100 | 90 |
| Ethylene-vinylacetate copolymer *5 | | | | 10 | | |
| stearic acid | | 1 | 1 | 1 | 1 | 1 |
| Nocrac 300 | | 0.5 | 0.5 | 0.5 | 0.5 | 0.5 |
| Dicumyl peroxide | | 3 | 3 | 3 | 3 | 3 |
| Antimony trioxide | | 10 | 10 | 10 | 10 | 10 |
| Condensed bromoacenaphthylene | | 30 | 30 | 30 | 30 | 30 |
| White lead | | 5 | | | 5 | |
| Tribase | | | 10 | | | |
| Lead sulfate | | | | | | 10 |
| Specific surface area of lead compound (m$^2$/g) | | 1.20 | 1.92 | 1.20 | — | — |
| Moldability of sheet | | Excellent | Excellent | Excellent | No good*6 | No good*6 |
| Gel fraction (wt. %) *7 | | 73.5 | 74.2 | 75.0 | 45.9 | 51.1 |
| Heat deformation (%) *8 | | 13.0 | 13.9 | 13.8 | 43.7 | 42.4 |
| (Radiation resistance) | | | | | | |
| Initial | Tensile strength (kg/mm$^2$) | 1.87 | 1.80 | 2.13 | 1.37 | 1.43 |
| | Elongation (%) | 400 | 370 | 380 | 420 | 473 |
| After irradiation | Tensile strength (kg/mm$^2$) | 1.36 | 1.33 | 1.50 | 0.83 | 0.88 |
| | Elongation (%) | 145 | 137 | 130 | 78 | 90 |
| (Fire resistance) | | | | | | |
| Oxygen index | | 28.9 | 29.4 | 29.0 | 27.2 | 27.4 |
| (Hot-water resistance) | | | | | | |
| Initial | Volume resistance (Ω-cm) | $2.2 \times 10^{16}$ | $2.0 \times 10^{16}$ | $7.0 \times 10^{15}$ | $1.4 \times 10^{16}$ | $6.4 \times 10^{15}$ |
| | Dielectric breakdown voltage (kV/m) | 31.0 | 30.5 | 27.6 | 30.0 | 27.9 |
| After | Volume resistance (Ω-cm) | $2.4 \times 10^{16}$ | $1.8 \times 10^{16}$ | $6.4 \times 10^{15}$ | $7.1 \times 10^{12}$ | $5.0 \times 10^{11}$ |

TABLE 4-continued

| Formulating agent and characteristics item | | Example 10 | Example 11 | Example 12 | Comparative example 9 | Comparative example 10 |
|---|---|---|---|---|---|---|
| exposure | Dielectric breakdown voltage (kV/mm) | 30.4 | 30.5 | 27.0 | 13.5 | 8,3 |

*4 Density: 0.920, MI:1.0
*5 Density: 0.940, MI:2,5, Content of vinylacetate: 19%
*6 Because of surface burning, smooth sheet could not be obtained.
*7 Determined after immersed for 24 hours at 120° C. in xylene.
*8 Measured after loaded with 3 kg at 120° C.

EXAMPLE 13 THROUGH 16

To ethylene-propylene-diene copolymer, the formulating agents were added so as to get the compositions shown in Table 5.

Sheets were made according to the processing recipe in Example 6 through 9 and the estimation of performance of molded sheets were made by the method in said examples. The results are shown in Table 5.

Besides, with regard to the condensed bromoacenaphthylene composition, one used in Example 13 and 14 is same as in Example 1 and one used in Example 15 and 16 is same as in Example 6.

provement in the hot-water resistance and the formulation is serving also for the improvement in the radiation resistance.

Whereas, evidently, the compositions formulated with nonbasic lead compounds lead such as chloride and lead sulfate, as illustrated in Comparative example 8 and 10, hardly have effect on improvement in hot-water resistance, even though they may be increased in parts formulated.

EXAMPLE 17 THROUGH 19 AND COMPARATIVE EXAMPLE 11 THROUGH 13

After the kneading and granulation, the compositions

TABLE 5

| Formulating agent and characteristics item | | | Example 13 | Example 14 | Example 15 | Example 16 |
|---|---|---|---|---|---|---|
| Ethylene-propylene-diene copolymer *1 | | | 100 | 100 | 100 | 100 |
| Nocrac 224 *2 | | | 1.5 | 1.5 | 1.5 | 1.5 |
| Sulfur | | | 0.4 | 0.4 | 0.4 | 0.4 |
| Talc | | | 100 | 100 | 100 | 100 |
| Zinc white | | | 5 | 5 | 5 | 5 |
| Stearic acid | | | 1 | 1 | 1 | 1 |
| Antimony trioxide | | | 11.8 | 11.8 | 11.8 | 11.8 |
| Dicumyl peroxide | | | 3 | 3 | 3 | 3 |
| Condensed bromoacenaphthylene | | | 45 | 45 | 45 | 45 |
| White lead | | | 15 | | | 30 |
| Tribase | | | | 15 | | |
| Litharge | | | | | 30 | |
| m-(m-Phenoxyphenoxy)diphenyl | | | 5 | | 5 | |
| Monoalkyldiphenyl ether | | | | 5 | | 10 |
| Specific surface area of lead compound (m$^2$/g) *3 | | | 1.20 | 1.92 | 0.34 | 1.20 |
| (Radiation resistance) | | | | | | |
| Initial | Tensile strength (kg/mm$^2$) | | 0.86 | 0.88 | 0.82 | 0.91 |
| | Elongation (%) | | 630 | 660 | 700 | 675 |
| After irradiation | Tensile strength (kg/mm$^2$) | | 0.87 | 0.82 | 0.80 | 0.90 |
| | Elongation (%) | | 150 | 155 | 160 | 145 |
| (Fire resistance) | | | | | | |
| Oxygen index | | | 34.6 | 34.4 | 35.2 | 35.0 |
| (Hot-water resistance) | | | | | | |
| Initial | Volume resistance ($\Omega$-cm) | | 3.9 × 10$^{15}$ | 4.4 × 10$^{15}$ | 5.0 × 10$^{15}$ | 4.5 × 10$^{15}$ |
| | Dielectric breakdown voltage (kV/mm) | | 24.8 | 23.0 | 24.4 | 23.7 |
| After exposure | Volume resistance ($\Omega$-cm) | | 4.2 × 10$^{15}$ | 4.0 × 10$^{15}$ | 4.6 × 10$^{15}$ | 4.4 × 10$^{15}$ |
| | Dielectric breakdown voltage (kV/mm) | | 25.0 | 22.6 | 24.1 | 24.2 |

*1 Made by Japan Synthetic Rubber Co., EP-21 (Bonding amount of propylene: 40% by weight).
*2 Made by Oouchi Shinko Co., 2,2,4-trimethyl-1,2-dihydroquinoline copolymer.
*3 Determined by BET method.

From foregoing examples, it is understood that the formulation of basic lead compound of the present invention to high molecular composition containing halogenated caenaphthylene and/or condensates thereof realizes improvement the hot-water remarkable resistance with the excellent radiation and fire resistance thereof not affected adversely.

Further, in the case of crosslinked polyethylene composition, it is evident that the problems of processability and heat deformation are solved in addition to the imin Example 1, 6 and 14 and Comparative example 5 and 6 were extruded for convering onto a tin-plated twisted wire made from soft copper with cross sectional area of 2 mm$^2$ so as the thickness to become 0.8 mm. Then, these were continuously vulcanized by heating under the conditions shown in Table 6 to give desired electric wires.

To the insulated electric wires thus obtained, 200 Mrad of γ-rays was irradiated at a dose rate of 0.5 Mrad/hr at room temperature in the air. Further, the insulated electric wires after the γ-ray irradiation were exposed to high-temperature steam of 150° C. and 4.9 km/cm² for 24 hours.

Of these insulated electric wires before and after the irradiation and after the exposure to steam, the mechanical and electric characteristics were estimated. The results are shown in Table 6.

EXAMPLE 20 THROUGH 22 AND COMPARATIVE EXAMPLE 14 THROUGH 16

After the kneading and granulation, the compositions in Example 5 and 10 and Comparative example 3 and 4 were extruded for covering onto a twisted wire made from soft copper with a cross sectional area of 5.5 mm² so as the thickness to become 1 mm. Then, these were continuously vulcanized by heating under the conditions shown in Table 7 to give desired electric wires.

TABLE 6

| Item | | Example 17 | Example 18 | Example 19 | Comparative example 11 | Comparative example 12 | Comparative example 13 |
|---|---|---|---|---|---|---|---|
| Composition of insulating material | | Example 1 | Example 6 | Example 14 | Comparative example 5 | Comparative example 5 | Comparative example 6 |
| Heat vulcanization condition | | Molten[1] salt | Nitrogen gas[2] | Steam[3] | Molten[1] salt | Steam[3] | Molten[1] salt |
| (Initial values) | | | | | | | |
| Mechanical characteristics | Tensile strength (kg/mm²) | 0.85 | 0.80 | 0.88 | 0.80 | 0.65 | 0.88 |
| | Elongation (%) | 520 | 500 | 610 | 530 | 620 | 550 |
| Dielectric breakdown voltage (kV)[4] | | 27 | 23 | 22 | 25 | 22 | 23 |
| (After irradiation of γ-rays) | | | | | | | |
| Mechanical characteristics | Tensile strength (kg/mm²) | 0.88 | 0.88 | 0.85 | 0.85 | 0.60 | 0.87 |
| | Elongation (%) | 140 | 130 | 150 | 140 | 150 | 140 |
| (After exposure to steam) | | | | | | | |
| Mechanical characteristics | Tensile strength (kg/mm²) | 0.55 | 0.52 | 0.55 | 0.45 | 0.33 | 0.55 |
| | Elongation (%) | 110 | 110 | 120 | 100 | 90 | 110 |
| Withstand voltage test[5] | | Acceptable | Acceptable | Acceptable | Rejected | Rejected | Rejected |

[1] Heat medium is inorganic salts with a melting point of 142° C., the main components thereof being sodium nitrate, potassium nitrate and sodium nitrite. Bath temperature: 200° C., Pressure of nitrogen gas: 3 kg/cm²
[2] Temperature of vulcanization tube: 200° C., Pressure of nitrogen gas: 5 kg/cm²
[3] Temperature of steam: 190° C., Pressure: 12 kg/cm²
[4] Into water were immersed 5 m of insulated electric wire and alternating voltage was charged between conductor and water at a rate of 30 kV/min to determine the voltage when the insulating material was broken down.
[5] After wound 1 m of insulated electric wire after exposure to steam round metallic mandrel with an outer diameter of 15 mm, this was immersed into water. when charged alternating voltage for 5 minutes between conductor and water at a rate of 2.6 kV, one, the insulating material thereof being not broken was made acceptable.

On the contrary to the fact that the wires in Example 17 through 19 are acceptable by the withstand voltage test even after the exposure to steam, those in Comparative example 11 through 13 were all rejected. Besides, with the wire in Example 17, the determination of breakdown voltage after the withstand voltage test resulted in 15 kV showing the sufficient tolerance, whereas one in Example 19 showed 6 kV being a somewhat lower result. Therefore, it was made clear that, as the heat vulcanization condition the molten salt was superior to the steam.

To the insulated electric wires thus obtained, 200 Mrad of γ-ray was irradiated at a dose rate of 0.5 Mrad/hr at room temperature in the air. Further, the insulated electric wires after the irradiation of γ-ray were exposed to high-temperature steam of 150° C. and 4.9 kg/cm² for 24 hours.

Of these insulated electric wires before and after the irradiation and after the exposure to steam, the mechanical and electric characteristics were estimated. The results are shown in Table 7.

TABLE 7

| Item | | Example 20 | Example 21 | Example 22 | Comparative example 14 | Comparative example 15 | Comparative example 16 |
|---|---|---|---|---|---|---|---|
| Composition of insulating material | | Example 5 | Example 10 | Example 10 | Comparative example 3 | Comparative example 3 | Comparative example 4 |
| Heat vulcanization condition | | Molten[1] salt | Molten salt | Steam[1] | Steam | Molten salt | Steam |
| (Initial values) | | | | | | | |
| Mechanical characteristics | Tensile strength (kg/mm²) | 1.85 | 1.77 | 1.89 | 1.72 | 1.70 | 2.25 |
| | Elongation (%) | 400 | 390 | 400 | 370 | 350 | 500 |
| Dielectric breakdown, voltage (kV)[1] | | 29 | 32 | 29 | 22 | 29 | 55 |
| (After γ-ray irradiation) | | | | | | | |
| Mechanical characteristics | Tensile strength (kg/mm²) | 1.81 | 1.59 | 1.55 | 1.40 | 1.42 | 1.30 |
| | Elongation (%) | 130 | 140 | 130 | 90 | 100 | 20 |
| (After exposure to steam) | | | | | | | |

TABLE 7-continued

| Item | | Example 20 | Example 21 | Example 22 | Comparative example 14 | Comparative example 15 | Comparative example 16 |
|---|---|---|---|---|---|---|---|
| Mechanical characteristics | Tensile strength (kg/mm²) | 1.35 | 1.30 | 1.27 | 1.35 | 1.37 | 1.35 |
| | Elongation (%) | 100 | 120 | 120 | 70 | 70 | 20 |
| Withstand voltage test[2] | | Acceptable | Acceptable | Accetable | Rejected | Rejected | Rejected |

[1] Same conditions as the footnotes of Table 6.
[2] After wound 1 m of insulated electric wire after exposure to steam round metallic mandrel with an outer diameter of 200 mm, this was immersed into water. When charged alternating voltage for 5 minutes between conductor and water at a rate of 3.5 kV, one, the insulating material thereof being not broken was made acceptable.

On the contrary to the fact that the wires in Example 20 through 22 are acceptable by the withstand voltage test even after the exposure to steam, those in Comparative example 14 through 16 were all rejected. Besides, with the wire in Example 21, the determination of breakdown voltage after the withstand voltage test resulted in 18 kV showing the sufficient tolerance, whereas one in Example 22 showed 7 kV being a somewhat lower result. Therefore, it was made clear that, as the heat vulcanization condition, the molten salt was superior to the steam.

As described above, the addition of diphenyl ether derivatives and/or basic lead compounds realizes uniform dispersion of halogenated acenaphthylene and/or condensates thereof in high molecular polymer and excellent hot-water resistance of the high molecular compositions. Therefore, because of the stably developed functionality of radiation resistance, the high molecular compositions of the present invention are extremely useful for the construction materials, covering insulation materials, packings, sealing materials, etc.

What is claimed is:

1. A radiation-resistant high molecular composition comprising a high molecular polymer, a halogenated acenaphthylene and/or condensates thereof represented by the following general formula (I):

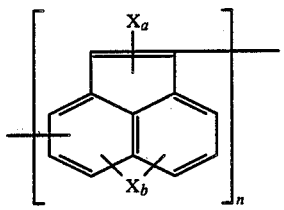

[I]

wherein, X indicates a chlorine or bromine atom, a indicates 0 to 2, b indicates 1 to 6 and n indicates an integer not less than 1, and a diphenyl ether derivative represented by the following general formula (II):

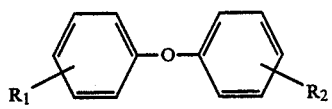

[II]

wherein $R_1$ and $R_2$ independently indicate hydrogen, alkyl, alkoxy, phenyl phenoxy, diphenyloxy or terphenyloxy.

2. The high molecular composition of claim 1, further comprising a basic lead compound.

3. The high molecular composition of claim 1, wherein the amount of said halogenated acenaphthylene and/or condensates thereof is 5 to 150 parts by weight per 100 parts by weight of the high molecular polymer.

4. The high molecular composition of claim 1, wherein the amount of said diphenyl ether derivative is 1 to 100 parts by weight per 100 parts by weight of said halogenated acenaphthylene and/or condensates thereof.

5. The high molecular composition of claim 2, wherein said basic lead compound is lead oxide, lead hydroxide, lead phosphate, lead phosphite, lead carbonate, lead sulfite, lead carboxylate, lead sulfide, lead borate or lead metaborate or a double salt thereof.

6. The high molecular composition of claim 3, wherein said basic lead compound is a powder whose specific surface area is at least 0.1 m²/g.

7. The high molecular composition of claim 3, wherein the amount of said basic lead compound to be formulated is 10 to 100 parts by weight per 100 parts by weight of said halogenated acenaphthylene and/or condensates thereof.

8. The high molecular composition of claim 1, wherein said high molecular polymer is a resin or elastomer selected from a group of thermoplastic resins, thermosetting resins and natural or synthetic rubbers.

9. The high molecular composition of claim 1, wherein the high molecular polymer is a polyolefinic resin or elastomer.

* * * * *